United States Patent [19]

Hilfman et al.

[11] 3,847,796

[45] Nov. 12, 1974

[54] HYDROCRACKING PROCESS FOR THE PRODUCTION OF LPG

[75] Inventors: Lee Hilfman, Mount Prospect; Ernest L. Pollitzer, Skokie; Edward Michalko, Chicago, all of Ill.

[73] Assignee: Universal Oil Products Company, Des Plaines, Ill.

[22] Filed: Mar. 15, 1973

[21] Appl. No.: 341,442

[52] U.S. Cl.............................. 208/111, 252/455 Z
[51] Int. Cl............................................. C10g 13/02
[58] Field of Search..................... 208/111, 138, 139

[56] References Cited
UNITED STATES PATENTS

| | | | |
|---|---|---|---|
| 3,598,724 | 8/1971 | Mulaskey | 208/111 |
| 3,707,460 | 12/1972 | Bertolacini et al. | 208/111 |
| 3,769,235 | 10/1973 | White et al. | 208/111 |
| 3,718,575 | 2/1973 | Watkins | 208/111 |
| 3,620,963 | 11/1971 | Mulaskey | 208/111 |
| 3,617,507 | 11/1971 | Oettinger et al. | 208/111 |
| 3,617,483 | 11/1971 | Child et al. | 208/111 |
| 3,562,144 | 2/1971 | Child et al. | 208/111 |
| 3,511,773 | 5/1970 | Addison et al. | 208/139 |
| 3,546,102 | 12/1970 | Bertolacini | 208/138 |
| 3,619,412 | 11/1971 | Clement et al. | 208/111 |
| 3,775,298 | 11/1973 | Morris et al. | 208/111 |
| 3,547,807 | 12/1970 | Hansford | 208/111 |

*Primary Examiner*—Delbert E. Gantz
*Assistant Examiner*—James W. Hellwege
*Attorney, Agent, or Firm*—James R. Hoatson, Jr.; Thomas K. McBride; William H. Page, II

[57] ABSTRACT

Hydrocarbons are converted with a catalyst comprising a Group VIII metal component combined with a support containing alumina and finely divided crystalline mordenite particles. Key feature of the process involves the critical quantity of mordenite present in the composition, thereby effecting and maximizing some basic enhancement of the ability of the resultant catalyst to accelerate hydrocarbon conversion reactions that depend on carbonium ion intermediates: that is, the activity level of the resultant composite is markedly increased.

6 Claims, 1 Drawing Figure

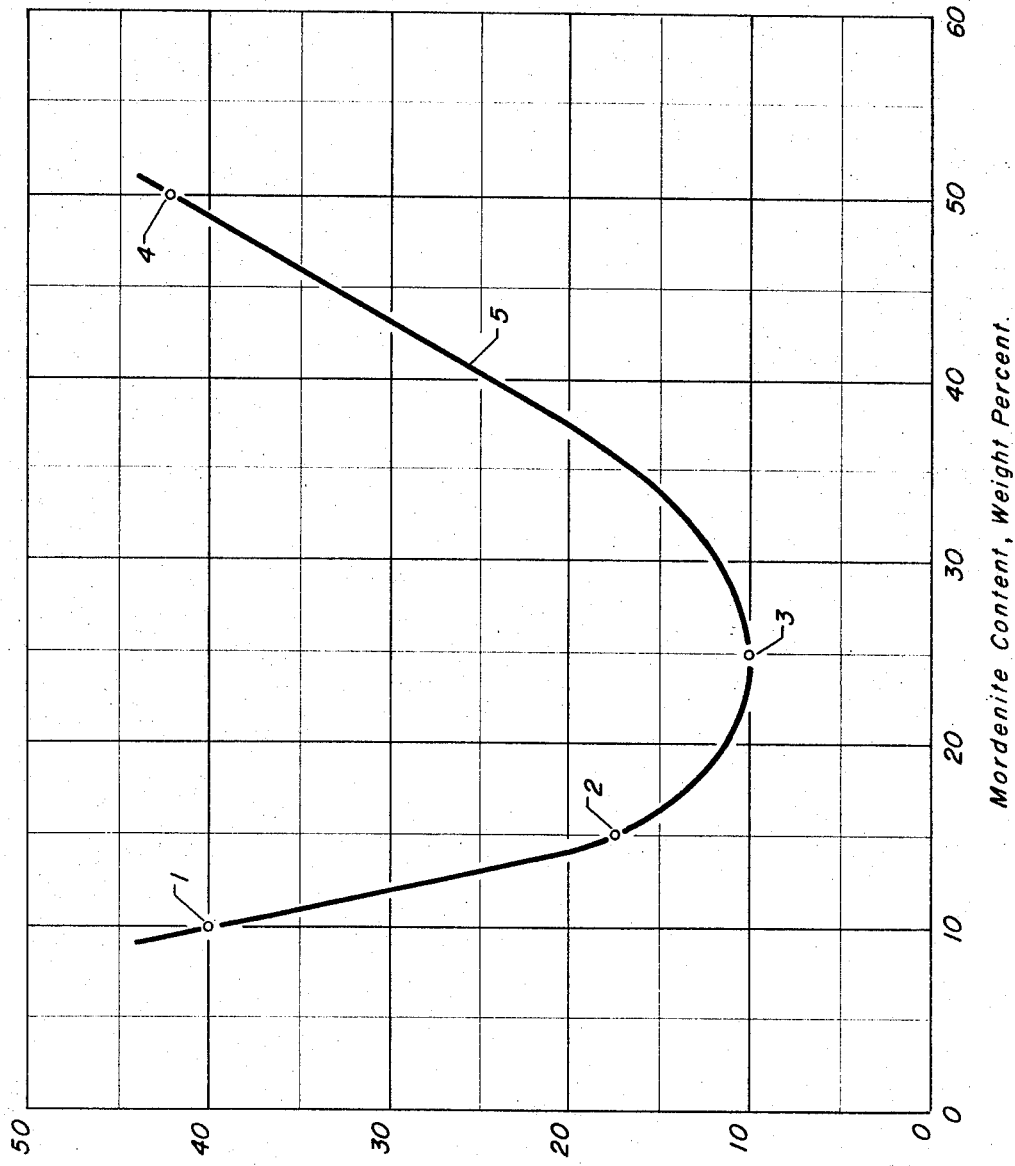

HYDROCRACKING PROCESS FOR THE PRODUCTION OF LPG

The invention encompassed by the present application relates to a hydrogen-consuming process for selectively producing LPG from a hydrocarbon charge stock boiling below 600°F. Hydrocracking processes are commonly employed for the conversion of heavier hydrocarbons into lower boiling saturated products. Economically successful LPG hydrocracking processes must be selective in order to avoid the decomposition of normally liquid hydrocarbons into undesirable gaseous hydrocarbons such as methane and ethane while maintaining a high activity for extended periods of time. The present invention utilizes a catalytic composite comprising a Group VIII metal component combined with a support containing alumina and finely divided mordenite particles.

Solid catalysts having a propensity to accelerate so-called acid-catalyzed reactions are widely used today in hydrocracking processes. In many applications these catalysts are used by themselves to accelerate the reactions which mechanically are thought to proceed by carbonium ion intermediates. In other applications these acidic catalysts are combined with a hydrogenation-dehydrogenation metallic component to form a dual-function catalyst having both a cracking function and a hydrogenation-dehydrogenation function. In this latter case, the cracking function is generally thought to be associated with an acid-acting material of the porous, adsorptive, refractory oxide-type which is typically utilized as the support or carrier for a heavy metal component such as the metals or compounds of metals of Group VI or Group VIII of the Periodic Table to which the hydrogenation-dehydrogenation function is generally attributed.

In order to effect an acceptable, economically feasible hydrocracking process, the prior art proposes to combine crystalline aluminosilicates with an alumina material to produce a catalyst having an acidic function which is substantially greater than the sum of the acidity contributed by the alumina alone and the crystalline alumino-silicate alone.

The primary objective of the present invention is to provide an improvement in the process for selectively producing LPG from a hydrocarbon charge stock boiling below 600°F. As hereinafter indicated by specific example, the improvement resides in the chemical character of the catalytic composites which may be used in the catalytic reaction zone. The use of the improvement of the present invention results in a process which exhibits an increased activity without sacrificing the selectivity of the catalyst to produce LPG. A related object is, therefore, to provide a process which functions economically for an extended period of time as a result of the increased efficiency arising through the use of the improved catalytic composite.

Therefore, in a broad embodiment, the present invention relates to an improvement in a hydrogen-consuming process for selectively producing LPG from a hydrocarbon charge stock boiling below about 600°F., contacting said charge stock and hydrogen with a catalyst comprising a Group VIII metal component and combined with an alumina carrier material containing a uniform distribution of finely divided mordenite particles, at hydrocracking conditions including a pressure of about 300 to about 1800 psig., a temperature of about 600°F. to about 850°F., a LHSV of about 1 to about 10 hr.$^{-1}$ and a hydrogen circulation rate of about 5000 SCFB to about 15,000 SCFB based on fresh charge stock, which catalyst is prepared by commingling said mordenite with an aluminum halide sol, gelling the resultant mixture, then calcining the gelled mixture, wherein the improvement comprises: said alumina carrier material contains about 20 to about 30 weight percent mordenite.

From the foregoing embodiment, it will be noted that the improvement in hydrocarbon hydrocracking for the production of LPG, encompassed by the present invention, is specifically directed toward the composition of the catalytic composite.

Heretofore, it was believed, and the prior art so indicates, that only a relatively small percentage of mordenite was required to enhance the hydrocracking characteristics of an alumina support material. Although it may be expected that those skilled in the art would attempt to adjust catalyst compositions and component percentages in the hope of finding an improved catalyst, such a person would not be able to accurately predict a complex correlation between a catalytic composition and its hydrocracking activity merely by varying the catalyst component percentages unless extensive experimental work had been performed. We not only have found that the hydrocracking activity of a mordenite containing alumina catalyst may be substantially increased by increasing the mordenite content but that the degree of activity does not bear a linear relationship to the quantity of mordenite in the catalyst. Under the circumstances, an alumina catalyst containing a narrow range percentage of mordenite exhibits an unusually high hydrocracking activity which is completely unexpected.

The criticality of mordenite concentration within the carrier material employed in the preparation of the catalytic composite is illustrated in accompanying FIG. 1. The data utilized in formulating FIG. 1 were obtained in accordance with the specific example hereinafter set forth. Briefly, however, with reference to FIG. 1, data points 1, 2, 3, and 4, through which curve 5 is drawn were obtained by processing a naphtha at constant conversion conditions, varying only the composition of the carrier material employed in preparing the catalytic composites. As indicated, the carrier material was, in all instances a composite of mordenite and alumina and each carrier material, following the formation thereof, was impregnated to give the finished catalyst a platinum concentration of 0.75 weight percent. It will be noted that an alumina catalyst containing approximately 25 weight percent mordenite exhibits extremely good activity by requiring a relatively low reaction temperature to achieve the desired conversion. The criticality attached to the range of mordenite composition of from about 20 to about 30 weight percent is readily ascertained by the character of the curve, in that a mordenite concentration less than 20 percent or greater than 30 percent produces a catalytic composite which exhibits inferior activity which is, therefore, not well-suited for the production of LPG from higher boiling hydrocarbons.

The character of the curve in FIG. 1 is unusual, and totally unexpected in view of the teachings of the prior art respecting the composition of the carrier material utilized in the preparation of catalytic composites suitable for utilization in the production of LPG. It has clearly been shown that the hydrocracking activity is not simply a matter of random adjustment of the composition of the carrier material, but that unexpected benefits arise as a result of utilizing a narrow range of mordenite in the catalytic composites.

As hereinbefore set forth, the process of the present invention is particularly directed to the processing of hydrocarbons and mixtures of hydrocarbons boiling below 600°F. Since the production of LPG is to be maximized, suitable charge stocks will include "gasoline boiling range hydrocarbons" having an initial boiling point of about 100°F. to about 125°F. and an end boiling point which may range from 350+F. to about 450°F., kerosene fractions and light gas oils boiling up to a temperature of about 600°F. These charge stocks may be isolated by well-known processing techniques from tar sand, shale and coal. The effluent streams from cokers, thermal crackers, fluid catalytic crackers, solvent extraction units, crude units, hydrocrackers, hydrodesulfurization units, visbreakers, and vapor recovery units may also supply hydrocarbons for these charge stocks.

Such charge stocks may be successfully processed even though trace quantities of sulfur are present. However, the hydrocarbon feed to be utilized in the present invention is preferably hydrotreated to essentially remove any sulfur or nitrogen which the feed may contain.

As indicated above, the catalyst of the present invention comprises a Group VIII metal component combined with a support containing alumina and mordenite particles. Considering first the alumina utilized in the present invention it is preferred that the alumina be a porous, adsorptive, high surface area material having a surface area of about 25 to about 500 or more square meters per gram. Suitable alumina materials are the crystalline aluminas known as gamma-, eta-, and theta-alumina with gamma-alumina giving best results.

It is an essential feature of the present invention that the alumina support contains finely divided mordenite particles. As is well known to those skilled in the art, mordenite is composed of a three-dimensional interconnecting network structure of silica and alumina tetrahedra. The tetrahedra are formed by four oxygen atoms surrounding a silicon or aluminum atom, and basic linkage between the tetrahedra are through the oxygen atoms. These tetrahedra are arranged in an ordered structure to form interconnecting cavities or channels of uniform size interconnected by uniform openings or pores. The ion-exchange property of mordenite follows from the trivalent nature of aluminum which causes the alumina tetrahedra to be negatively charged and allows the association of cations with them in order to maintain an electrical balance in the structure. The molecular sieve property of mordenite follows from the uniform size of the pores thereof which pores can be related to the size of molecules and used to remove from a mixture of molecules, the molecules having a critical diameter less than or equal to the diameter of the pore mouths. For purposes of the present invention, it is preferred to use mordenite having pore mouths of about 5 Angstroms in cross-sectional diameter and more preferably about 5 to about 15 Angstrom units. Ordinarily, mordenite is synthetically prepared in the alkali metal form with one alkali metal cation associated with each aluminum centered tetrahedra. The alkali metal cation may be thereafter ion-exchange with polyvalent cations such as calcium, magnesium, beryllium, rare earth cations, etc. Another treatment of alkali metal mordenite involves ion-exchange with ammonium ions followed by thermal treatment, preferably above 300°F. to convert to the hydrogen form. When the mordenite contains a high mole ratio of silica to alumina (for example, above 5) the material may be directly converted to an acid form in a suitable acid medium.

Although in some cases the polyvalent form of the mordenite may be used in the present invention, it is preferred to use the hydrogen form such as the alkali metal form, which is convertible to the hydrogen form during the course of the essential incorporation procedure discussed below.

The preferred mordenite for use in the present invention is the hydrogen and/or polyvalent forms of synthetically prepared mordenite. In fact, we have found best results with synthetic mordenite having an effective pore diameter of about 4 to about 6.6 Angstrom units and a mole ratio of silica to alumina of about 9 to 12. As is well known to those skilled in the art, mordenite differs from other known crystalline aluminosilicates in that its crystal structure is believed to be made-up of chains of 5-member rings of tetrahedra which apparently are arranged to form a parallel system of channels having diameters of about 4 to 6.6 Angstroms interconnected by smaller channels having a diameter of about 2.8 Angstroms. Mordenite is characterized by the following formula:

$$0.9 \pm 2M_{2/n}O : Al_2O_3 : X\ SiO_2 \text{ (anhydrous form)}$$

wherein M is a cation which balances the electrovalences of the tetrahedra, n is the valance of M, and X is a constant generally ranging in value from 9 to 11 and usually about 10. These synthetic mordenite type zeolites are available from a number of sources, one being the Norton Company of Worcester, Mass.

Regarding the method of incorporating the mordenite particles into the alumina support, it is an essential feature of the present invention that the mordenite particles are added directly to an alumina hydroxyl halide sol prior to the sol being gelled. Although in some cases sol formed with fluorine, bromine, or iodine, may be satisfactory, we have found best results are obtained with an aluminum hydroxyl chloride sol formed by dissolving substantially pure aluminum metal in hydrochloric acid to result in a sol having a weight ratio of aluminum to chloride of about 1:1 to about 1.4:1. Additionally, it is preferred that the sol have a pH of about 2 to about 5. One advantage of this feature of the present invention is the relative ease with which the mordenite particles can be uniformly distributed in the resulting catalyst. However, the most important advantage is that the sol appears to react with the mordenite, causing some basic modification of its structure which enables the resulting support to have unusual ability to catalyze reactions which depend on carbonium ion intermediates such as hydrocracking to $C_3$ and $C_4$ fragments.

Accordingly, it is an essential feature of the present invention that the catalyst thereof is produced by the following steps: commingling finely divided mordenite particles with an aluminum hydroxyl halide sol to form a mixture thereof; gelling the resultant mixture to produce a hydrogel or particles of a hydrogel; then finishing the hydrogel into the catalyst by standard aging, washing, drying, and calcination treatments. For purposes of the present invention, the catalyst may be formed in any desired shape such as spheres, pellets, pills, cakes, extrudates, powders, granules, etc. However a particularly preferred form of the catalyst is the sphere; and spheres may be continuously manufactured by the well known oil drop method which comprises forming an alumina hydrosol, preferably by reacting aluminum metal with hydrochloric acid, combining the hydrosol with a suitable gelling agent such as hexamethylenetetramine to form a dropping solution, uniformly distributing finely divided mordenite particles throughout the dropping solution, and dropping the resultant mixture into an oil bath maintained at elevated temperatures. Alternatively, the particles may be commingled with the sol to form a mixture thereof and the gelling agent thereafter added to the mixture to form the dropping solution. In either case, the droplets of the mixture remain in the oil column until they set and form substantially spherical hydrogel particles. The spheres are then continuously subjected to specific aging treatments in oil and an ammoniacal solution to further improve their physical characteristics.

Alternatively, the hydrogel spheres may be pressure aged in the dropping oil or a similar oil which may make atmospheric aging in an ammoniacal solution unnecessary. Suitable conditions for pressure aging would include a temperature from about 20°C. to about 300°C. with a pressure sufficient to maintain the system in liquid phase. The resulting aged and gelled particles are then washed and dried at a relatively low temperature of about 300°F. to about 400°F. and subjected to a calcination procedure at a temperature of about 850°F. to about 1300°F. for a period of about 1 to about 20 hours. This treatment effects conversion of the alumina hydrogel to the corresponding crystalline gamma-alumina. See U.S. Pat. No. 2,620,314 for additional details regarding this oil drop method.

The amount of mordenite in the resulting alumina support is preferably about 20 to about 30 weight percent thereof. By the expression "finely divided" it is meant that the mordenite is used in a particle size having an average diameter of about 1 to about 100 microns, with best results obtained with particles of average diameter of less than 40 microns.

The catalyst of the present invention may contain a halogen component. Although the precise form of the chemistry of the association of the halogen component with the alumina support is not entirely known, it is customary in the art to refer to the halogen component as being combined with the alumina support, or with the other ingredients of the catalyst. This combined halogen may be either fluorine, chlorine, iodine, bromine, or mixtures thereof. Of these, fluorine, and particularly chlorine are preferred for the purposes of the present invention. As indicated above, a halogen component is inherently incorporated in the catalyst during preparation thereof. If desired, additional halogen may be added to the calcined catalyst as an aqueous solution of an acid such as hydrogen fluoride, hydrogen chloride, hydrogen bromide, etc. Moreover, an additional amount of the halogen component, may be composited with the catalyst during the impregnation of the latter with the Group VIII metal component. In any event, the halogen component may be combined with the support in amounts sufficient to result in a final catalyst which contains about 0.01 to about 1.5 weight percent and preferably about 0.1 to about 1.0 weight percent halogen calculated on an elemental basis.

An essential component of the catalyst is the Group VIII metal component. The Group VIII metal may exist within the final catalytic composite as a compound such as an oxide, sulfide, halide, or in an elemental state. Generally, the amount of the Group VIII metal component present in the final catalyst is small compared to the other components combined therewith. The Group VIII metal component generally comprises about 0.05 to about 1.5 weight percent of the final catalytic composite calculated on an elemental basis. Suitable Group VIII metals are platinum, iridium, osmium, palladium, rhodium, ruthenium, nickel, cobalt and iron. However, palladium and platinum are preferred.

The Group VIII metal component may be incorporated in the catalytic composite in any suitable manner such as ion-exchange and/or impregnation with a suitable solution of the metallic component. However, it is an essential feature of the present invention that the Group VIII metal component is combined with the catalyst prepared by the method of the present invention after the calcination step described above. Accordingly, the preferred method of preparing a dual-function catalyst comprising a Group VIII metal component combined with the catalyst prepared by the method outlined above involves the utilization of water-soluble compounds of the Group VIII metal component to impregnate the calcined catalyst. For example, platinum metal may be added to the support by commingling the latter with an aqueous solution of chloroplatinic acid.

Regardless of the details of how the Group VIII metal component of the catalyst is combined with the catalyst, the resulting dual-function catalyst generally will be dried at a temperature of from about 200°F. to about 600°F. for a period of from about 2 to 24 hours or more and finally calcined at a temperature of about 700°F. to about 1100°F. for a period of about 0.5 to about 10 hours, and preferably 1 to about 5 hours.

It is preferred that the resultant calcined dual-function catalytic composite be subjected to reduction conditions prior to its use in the conversion of hydrocarbons. This step is designed to insure a uniform and finely divided dispersion of the Group VIII metal component throughout the carrier material. Preferably, substantially pure and dry hydrogen is used as the reducing agent in this step. The reducing agent is contacted with the calcined catalyst at a temperature of about 800°F. to about 1200°F. and a period of time of about 0.5 to 10 hours or more effective to substantially reduce the Group VIII metal component to its elemental state. This reduction treatment may be performed in situ as part of a start-up sequence if desired.

Although it is not essential, the resulting reduced dual-function catalyst is preferably subjected to a presulfiding operation designed to incorporate in the catalytic composite from about 0.05 to about 1.5 weight percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of the sulfur component, generally including a temperature ranging from about 50°F. to about 1100°F. or more.

Both reduction and presulfiding of the catalyst may alternatively be performed simultaneously by contacting the calcined catalyst with a gas such as a mixture of hydrogen and hydrogen sulfide having about 10 moles of hydrogen per mole of hydrogen sulfide at conditions sufficient to effect the desired reduction and sulfiding, generally including a temperature ranging from about 50°F. to about 1100°F. or more.

According to the present invention, a hydrocarbon is contacted with a catalyst of the type described above in a hydrocarbon conversion zone at hydrocarbon conversion conditions. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, the charge stock is preheated by any suitable heating means to the desired reaction temperature and then passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactant may be contacted with the catalyst bed in either upward, downward, or radial flow fashion. In addition, it is to be noted that the reactants may be in the liquid phase, a mixed liquid-vapor phase, or a vapor phase when they contact the catalyst with best results obtained in the vapor phase.

An effluent stream is withdrawn from the conversion zone and passed through a condensing means to a separation zone, typically maintained at about 50° to about 125°F., wherein a hydrogen-rich gas is separated from a LPG rich liquid product. Preferably, at least a portion of this hydrogen-rich gas is withdrawn from the separating zone and is then recycled through suitable compressing means back to the conversion zone. The liquid phase from the separating zone is then typically withdrawn and commonly treated in a fractionating system in order to recover LPG (i.e., liquefied petroleum gas) and other light ends.

The following examples are given to further illustrate the process of the present invention and to indicate the benefits to be afforded through the utilization thereof. It is understood that the Example I is given for the sole purpose of illustrating the means by which curve 5 in the accompanying FIG. 1 is obtained, and that all of the examples are not intended to limit the generally broad scope and spirit of the appended claims.

EXAMPLE I

The data presented in this example is pertinent to accompanying FIG. 1, and the latter should be referred to in conjunction with the following discussion. The hydrocarbon charge stock utilized in the test procedure for evaluating hydrocracking catalytic composites was a naphtha having a gravity, °API at 60°F., of 61.1, an initial boiling point of 144°F. and an end boiling point of 371°F. The naphtha contained 600 ppm. sulfur, 1 ppm. nitrogen and 11.2 volume percent aromatics. Catalyst portions in an amount of 100 cc. were employed in a reaction zone fabricated from stainless steel and were maintained under an imposed pressure of 1500 psig.

Naphtha was charged to the reaction zone at a rate sufficient to give a liquid hourly space velocity of 2.0, together with hydrogen in an amount of 10,000 scf/bbl. The reaction zone temperature was then slowly increased until a 67 percent conversion of the fresh feed to LPG was established. The temperature required to obtain the desired conversion was an indication of the catalytic composite's activity, i.e., the lower reaction temperatures denoted the highest catalytic activity.

Four separate batches of alumina-mordenite supports were prepared, each containing 50 weight percent, 25 weight percent, 15 weight percent and 10 weight percent mordenite, respectively. Aluminum metal, having a purity of 99.99 weight percent was digested in hydrochloric acid to produce an aluminum hydroxyl chloride sol having a weight ratio of Al/Cl of about 1.22. An aqueous solution containing 28 weight percent HMT (i.e., hexamethylenetetramine), was made and 700 cc. of the HMT solution was added to 700 cc. of the sol and throughly mixed to form a dropping solution. Previously, the required amount of mordenite in the form of a fine powder was commingled with the HMT solution and uniformly dispersed therein. The mordenite was analyzed for particle distribution size which showed that 57.6 weight percent of the powder was between 0 and 20 microns in size, 69.5 weight percent of the powder was between 0 and 40 microns in size and 82.1 weight percent was between 0 and 60 microns in size.

The dropping solution containing the dispersed mordenite was passed through a vibrating dropping head and dropped in discrete spherical particles into a forming oil maintained at 95°C. The rate of vibration and the volumetric flow of the dropping solution were controlled to produce finished spherical particles of about one-sixteenth of an inch in diameter. The dropped hydrogel spheres were then pressure aged for 1.5 hrs. at 150°C. and 100 psig. The aged spherical particles were water washed to remove neutralization salts and dried. The particles were thereupon calcined at 650°C. for 2 hours in dry air to give a catalyst support having an apparent bulk density of about 0.52 gm./cc., a surface area of about 200 m.2/gm., a pore volume of about 0.54 ml./gm. and an average pore diameter of about 105 Angstroms.

About 350 cc. of each of the previously prepared batches of supports was placed in a steam jacketed rotating vessel with 350 cc. of an impregnation solution containing chloroplatinic acid and HCl. The vessel was rotated until all the liquid solution was evaporated. The particles were then oxidized to produce a finished catalyst containing about 0.75 weight percent platinum. The oxidized catalyst was then reduced and sulfided with a gaseous mixture containing about 10 moles of $H_2$ and 1 mole of $H_2$ at a temperature of about 775°F.

The four finished catalysts were then subjected to the activity test procedure hereinabove described. The following Table I indicates the catalyst designation (having reference to the datum points of accompanying FIG. 1), the quantity of mordenite in the carrier material, and the reaction zone temperature above base required for constant conversion.

TABLE I

Evaluation for Hydrocracking Activity

| Catalyst No. | 1 | 2 | 3 | 4 |
|---|---|---|---|---|
| Mordenite Concentration, wt.% | 10 | 15 | 25 | 50 |
| Reaction Zone Temperature Above Base Required For Constant Conversion, °C. | 40 | 17 | 10 | 42 |

From the data presented in foregoing Table I and with reference to accompanying FIG. 1, it will be seen that the four catalysts, having increasing concentrations of mordenite in the carrier material, the latter ranging from 10 percent to 50 percent by weight, did not produce increasing hydrocracking activities. This is clearly brought out upon comparing the results obtained through the use of catalysts 1, 2, 3, and 4. These data were employed in preparing curve 5 of FIG. 1, which curve clearly illustrates the criticality attached to a mordenite concentration within the range of about 20 percent to about 30 percent by weight, in order to minimize the temperature required to perform a 67 percent conversion of the feed stock.

EXAMPLE II

This example demonstrates the capability of the catalyst of this invention to produce excellent yields of LPG from a hydro-carbon boiling above the gasoline boiling range.

A portion of one of the catalysts prepared in Example I whose support contained 25 weight percent mordenite and 75 weight percent alumina was selected to hydrocrack a kerosene charge stock boiling in the range of from about 405° to about 550°F. and containing 3 weight ppm. sulfur. The kerosene was charged to a fixed bed reaction zone containing the catalyst at conditions including a LHSV of 3.0 hr.$^{-1}$, a hydrogen circulation rate of 10,000 SCFB based on fresh feed, a pressure of 1000 psig., and a temperature of 760°F.

At the above-mentioned conditions, the kerosene charge stock was converted to approximately 75 weight percent LPG and 25 weight percent pentane with only small quantities of methane and ethane being produced.

EXAMPLE III

Since the catalyst of Example II demonstrated the ability to produce LPG from a kerosene charge stock, a heavier feed stock was selected and charged to a fixed bed reactor containing a catalyst identical to that used in Example II at conditions including a LHSV of 2.0 hr.$^{-1}$, a hydrogen circulation rate of 10,000 SCFB and a pressure of 1000 psig. The heavier feed stock was an atmospheric gas oil boiling in the range of from about 650° to about 800°F. In order to initiate a significant amount of hydrocracking, excessive reactor temperatures were required which prevented a selective production of LPG and also caused premature coking of the catalyst which led to an extremely short catalyst life.

The foregoing specification and examples clearly illustrate the improvements encompassed by the present invention and the benefits to be afforded a process for the production of LPG from higher-boiling hydrocarbon charge stock.

We claim as our invention:

1. A hydrogen-consuming process for selectively producing LPG from a hydrocarbon charge stock boiling below about 600°F., which comprises contacting said charge stock and hydrogen with a catalyst comprising a Group VIII metal component combined with an alumina carrier material containing a uniform distribution of about 20 to about 30 weight percent of finely divided mordenite particles at hydrocracking conditions including a pressure of about 300 to about 1800 psig., a temperature of about 600°F. to about 850°F., a LHSV of about 1 to about 10 hr.$^{-1}$ and a hydrogen circulation rate of about 5000 SCFB to about 15,000 SCFB based on fresh charge stock, said catalyst having been prepared by commingling said mordenite with an aluminum halide sol, gelling the resultant mixture and then calcining the gelled mixture.

2. The process of claim 1 further characterized in that said Group VIII metal component is platinum or a platinum compound.

3. The process of claim 1 further characterized in that said Group VIII metal component is palladium or a palladium compound.

4. The process of claim 1 further characterized in that said Group VIII metal component is present in an amount from about 0.05 to about 1.5 weight percent.

5. The process of claim 1 further characterized in that said catalyst contains about 0.05 to about 1.5 weight percent halogen.

6. The process of claim 1 wherein said catalyst contains about 0.1 to about 1.5 weight percent sulfur.

* * * * *